(12) United States Patent
Grafl et al.

(10) Patent No.: US 7,938,870 B2
(45) Date of Patent: May 10, 2011

(54) LIQUID SEPARATOR WITH BYPASS

(75) Inventors: Dieter Grafl, Ulm (DE); Kai-Uwe Lemke, Ulm (DE)

(73) Assignee: d Dana Automotive Systems Group, LLC, Maumee, OH (US)

( * ) Notice: Subject to any disclaimer, the term of this patent is extended or adjusted under 35 U.S.C. 154(b) by 346 days.

(21) Appl. No.: 11/990,551

(22) PCT Filed: Aug. 17, 2006

(86) PCT No.: PCT/EP2006/008121
§ 371 (c)(1),
(2), (4) Date: Mar. 5, 2009

(87) PCT Pub. No.: WO2007/020089
PCT Pub. Date: Feb. 22, 2007

(65) Prior Publication Data
US 2009/0211454 A1 Aug. 27, 2009

(30) Foreign Application Priority Data
Aug. 17, 2005 (DE) .......................... 10 2005 038 896

(51) Int. Cl.
*B01D 50/00* (2006.01)
(52) U.S. Cl. ........................ 55/320; 55/423; 55/DIG. 19

(58) Field of Classification Search .................. 55/385.3, 55/320, 423, DIG. 19; 96/188; 123/41.86, 123/573
See application file for complete search history.

(56) References Cited

U.S. PATENT DOCUMENTS

| | | | |
|---|---|---|---|
| 3,933,449 A | 1/1976 | Miselem | |
| 5,417,184 A * | 5/1995 | McDowell | ................. 123/41.86 |
| 2004/0035294 A1 | 2/2004 | Atkinson et al. | |
| 2007/0281205 A1 | 12/2007 | Wagner | |

FOREIGN PATENT DOCUMENTS

| | | |
|---|---|---|
| DE | 2435458 | 2/1975 |
| DE | 2702148 | 7/1978 |
| DE | G 83 00 130.1 | 6/1983 |
| DE | 19951312 A1 | 5/2001 |
| DE | 10 2004011176 A1 | 10/2005 |
| DE | 10 2004 037157 | 3/2006 |
| EP | 0 330 704 A1 | 2/1988 |
| WO | WO 2007/020089 A2 | 2/2007 |

* cited by examiner

*Primary Examiner* — Robert A Hopkins
(74) *Attorney, Agent, or Firm* — Marshall & Melhorn, LLC

(57) ABSTRACT

A liquid separator for separating liquids from gases, having a pressure chamber and a suction chamber which are disposed in the gasflow in front of or behind a separation element is provided. The separator also may have a first siphon disposed in the suction chamber for drainage of the separated liquid, and a second siphon being disposed in the suction chamber, the barrier pressure of which is higher than the barrier pressure of the first siphon.

13 Claims, 3 Drawing Sheets

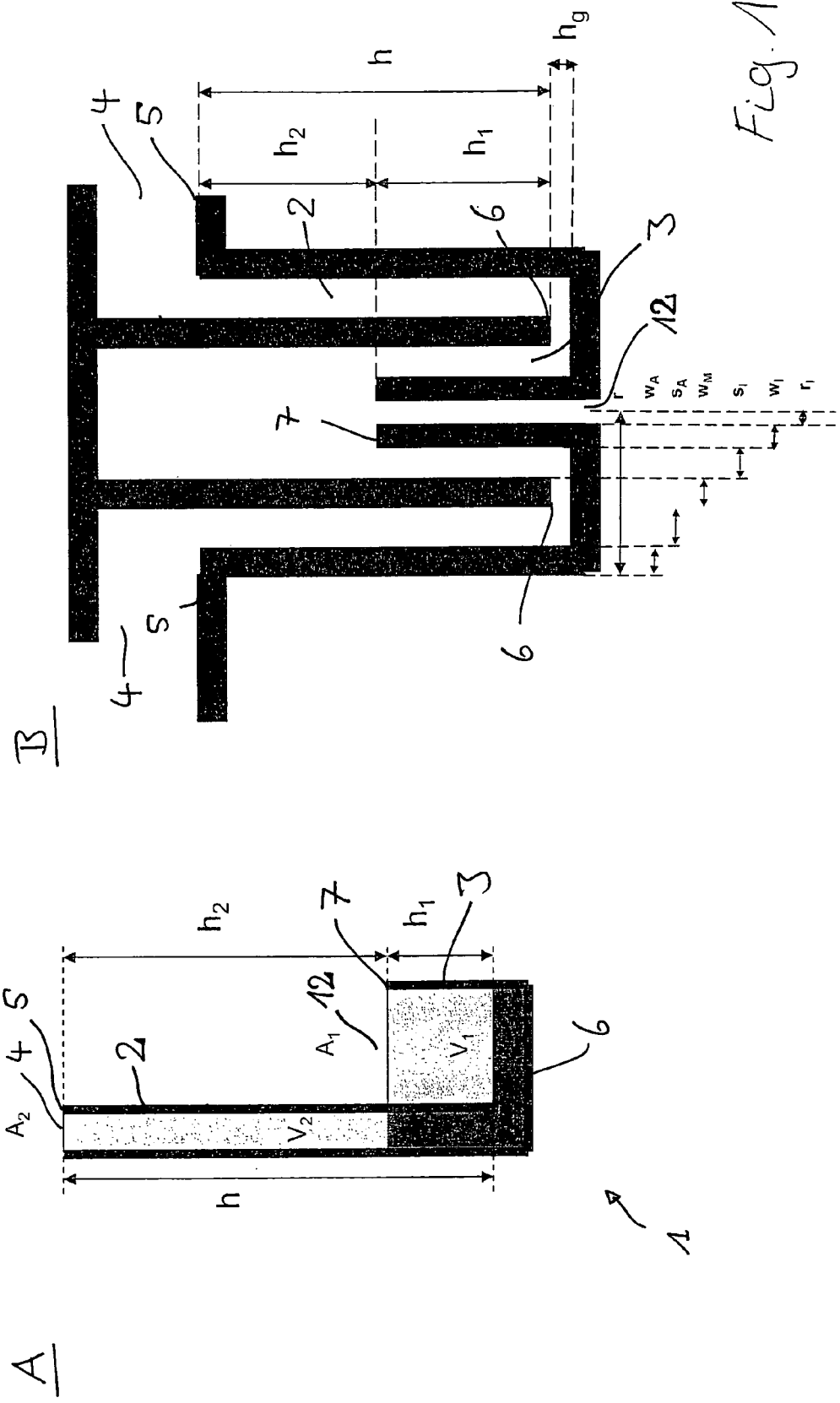

LIQUID SEPARATOR WITH BYPASS

FIELD OF THE INVENTION

The present invention relates to a liquid separator for separating liquids from gases, for example for separating water from waste gases of a fuel cell or oil from the crankcase gases (blowby gases, blow-through gases) of internal combustion engines.

BACKGROUND OF THE INVENTION

Cyclones or tube separators are known from the state of the art for separating liquids from gases, in the case of which the throughflowing air is set in a rotary motion and thus leads to separation of the particles due to centrifugal forces. Tube separators of this type are incorporated for example in cylinder head covers in order to clean there the blowby gases from the crankcase of an internal combustion engine of oil and oil mist. The pressure side of the tube separator is thereby connected to the crankcase, whilst the suction side guides the gases cleaned of oil or oil mist to the inlet manifold of the engine. The separated oil is generally guided back into the camshaft housing via a siphon. The siphon thereby has two functions. On the one hand, it leads to drainage of the oil from the suction-side chamber of the oil separator into the camshaft housing which belongs to the pressure side and, on the other hand, it leads to a barrier so that a pressure difference between the pressure side of the oil separator and the suction side of the oil separator can be maintained. Furthermore, the barrier effectively prevents oil spurting from the camshaft for example passing into the suction region.

A siphon of this type is illustrated in FIG. 1, the partial Figures A and B representing two different embodiments. A siphon 1 has accordingly two pipes 2 and 3 which communicate with each other at their lower end. The top pipe 2 is thereby connected by its upper side to the chamber to be drained, in the case of the oil separator in an internal combustion engine to the suction-side chamber of the oil separator. The outlet pipe 3 communicating with the top pipe 2 is open at the top and forms an overflow opening into the camshaft housing. Between the inlet 4 of the top pipe 2 and the outlet 12 with the outlet edge 7 of the outlet pipe 3 there is a height difference $h_2$ which corresponds to the maximum pressure difference between the inlet side and the outlet side of a barrier siphon. This maximum barrier differential pressure in the case of the prevailing drainage is $\Delta p = h_2 * \rho$, $\rho$ being the density of the liquid situated in the siphon (e.g. 0.9 for mineral oil at room temperature or 1.0 for water at room temperature).

If no drainage takes place and no oil ejected from the camshaft housing gets into the siphon, i.e. no liquid is situated in the volume $V_1$ of the outlet pipe which is situated above the edge 6 between the top pipe 2 and the outlet pipe 3, then the maximum barrier pressure difference without drainage is $\Delta p = h * \rho = (h_1 + h_2) * \rho$. h is thereby the length of the top pipe between its upper edge 5 and the lower edge 6 and $h_1$ is the length of the outlet pipe 3 between the lower edge 6 and its upper edge 7. The barrier height is reduced in case the volume $V_3$ of the outlet pipe 3 is smaller than the product of h and the average cross section $A_2$ of the top pipe 2. The barrier height is then referred to as effective barrier height with $h_{\text{eff}} = V_1/A_2 + h_1$.

FIG. 1 now represents two different siphon types, the top pipe 2 in FIG. 1A and the outlet pipe 3 having a common wall, the lower end of which forms the edge 6.

In FIG. 1B the inlet 4 is situated laterally in the top pipe 2, whilst the outlet pipe 3 is disposed within the top pipe 2. The outlet 12 is situated here in the centre. In this embodiment, both the top pipe 2 and the outlet pipe 3 have an annular cross-section.

If now a separated liquid flows via the inlet 4 into the top pipe 2, in the case of drainage, then it passes under the edge 6 into the outlet pipe 3. In the case of sufficient inflow of liquid, the liquid level rises in the volume $V_1$ in the outlet pipe 3 until the liquid overflows over the outlet edge 7.

In the case of oil separators for blowby gases, a differential pressure exists between inlet 4 and outlet 12 which corresponds to the pressure drop across the oil separator, not shown here. If the pressure drop and hence the differential pressure between the outlet 12 and the inlet 4 increases, then liquid is suctioned into the top pipe until the height difference between the liquid level in the top pipe 2 and the liquid level in the outlet pipe 3 corresponds to the pressure difference. If the low pressure on the inlet side 4 increases further, then the result can be that the liquid situated in total in the volume $V_1$ is suctioned into the top pipe 2 so that finally gases are suctioned via the outlet pipe 3 into the top pipe 2. At this moment, the barrier effect of the siphon is removed and gases are suctioned towards the inlet 4 through the top pipe 2. Furthermore, the latter entrain the liquid situated in the top pipe 2 also. Hence drainage of fluid is no longer provided from the inlet 4 to the outlet 12.

Situations of this type can occur, for example if the resistance in the oil separator which is present increases due to uncontrolled or excessive increase in gas volume flow and hence, between the inlet manifold (inlet 4) and the crankcase (outlet 12), a very high differential pressure is formed. In this case, the oil collected in the volume $V_1$ is drawn back into the valve cover and the siphon opening as a result can be subjected subsequently to a flow of blowby gases laden with oil particles. The oil which is suctioned upwards will then discharge in the direction of the inlet manifold and can lead to damage to the engine. This so-called oil entrainment is greatly feared by engine manufacturers. When using a tank with a valve, as is common in the state of the art, the crankcase can also be pressurised in this operating state, which leads to lack of sealing at the corresponding bearing seals. Tank solutions are therefore equipped with an excess pressure valve on the oil separator.

It is however disadvantageous in this respect that this excess pressure valve has mechanical elements as bypass circuit and, for its part, can become soiled. As a result, it can become permanently unsealed or also completely clogged. On a long term basis no reliable function of these bypass circuits is hence ensured.

SUMMARY OF THE INVENTION

The present invention now begins here and sets the object of making available a liquid separator in which, upon increasing the differential pressure between the pressure side and the suction side of a liquid separator, the discharge of the separated liquid can continue to be ensured. This liquid separator is intended to have a simple configuration and to make possible a reliable method for a bypass circuit around the separator in particular at low cost.

This object is achieved by a liquid separator according to claim 1. Advantageous developments of the liquid separator according to the invention are given in the respective dependent claims.

According to the invention, two siphons are provided now on the suction side of the separation element in the liquid separator, said two siphons having a different barrier pressure. The first siphon thereby has a maximum barrier pressure which corresponds at least to the pressure difference in normal operation of the liquid separator. The second siphon has a higher barrier pressure because of a higher effective barrier height. If now the pressure difference between the inlet and the outlet of the siphon exceeds the maximum barrier pressure of the first siphon, then this first siphon empties in the direction of the low pressure, i.e. in the direction of the suction side and opens a gas-throughflowed opening between its outlet and its inlet, for example between camshaft housing and inlet manifold of an internal combustion engine. This can occur for example when the separation elements in the liquid separator ice up or are subjected to an increased volume flow and the flow resistance thereof rises. As long as this excessive pressure difference persists, a large part of the gases flows in the reverse direction to the drainage through the first siphon. The liquid possibly separated from this gas flow or from the gas flow which continues to pass the separator can then however discharge nevertheless via the second, somewhat longer siphon so that drainage of the suction side of the liquid separator continues to be provided.

Particularly advantageously, a separation element can be introduced into the first siphon so that the gases flowing through the first siphon from the outlet side thereof to the inlet side thereof are freed at least partially in a rough manner of the liquid. Furthermore, at least one separation element can be disposed also in the suction-side chamber of the liquid separator. The separation element can concern for example a deflection separator via which liquid or liquid mist can be separated from the gas flowing through the first siphon. This separated liquid or liquid mist can then be discharged through the second siphon.

Furthermore, the second siphon requires only a barrier pressure which is increased insubstantially relative to the first siphon since, in the case of entrainment through the first siphon, lowering of the differential pressure between the suction side and the pressure side of the separator immediately occurs and thus the drainage and barrier effect of the second siphon remains ensured in all cases.

It is advantageous in the present invention that no mechanical parts are required. The operational reliability of this system is therefore provided at all times, in particular the second siphon cannot be soiled or clogged. Hence a long-term functional reliability of this bypass circuit according to the invention is also ensured. Also the additional material outlay for the second siphon is of very little consequence so that this solution is also very cost-effective.

An example of a liquid separator according to the invention is described in the following. This example is thereby represented by means of an oil separator for blowby gases. The application of the present invention is however not restricted to this application purpose.

In addition to FIG. 1, which explains the design of siphons, FIG. 2 shows a double siphon according to the invention of an oil separator in various operational states in the partial pictures A to E. Identical or similar reference numbers are thereby used in all the Figures for identical or similar elements.

BRIEF DESCRIPTION OF THE DRAWINGS

FIG. 1B is a schematic, cut-away side view of another embodiment of a siphon.

DETAILED DESCRIPTION OF THE PREFERRED EMBODIMENTS

Figure 2:
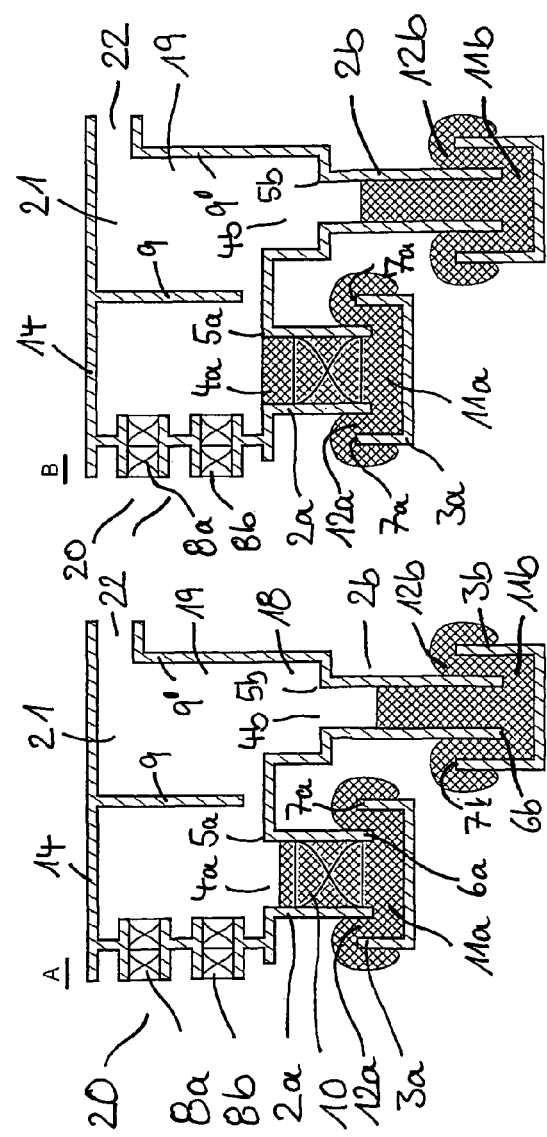
FIGS. 2A-2E depict yet another schematic cut-away side view of yet another embodiment of a double siphon in various stages of operation.
Figure 2:
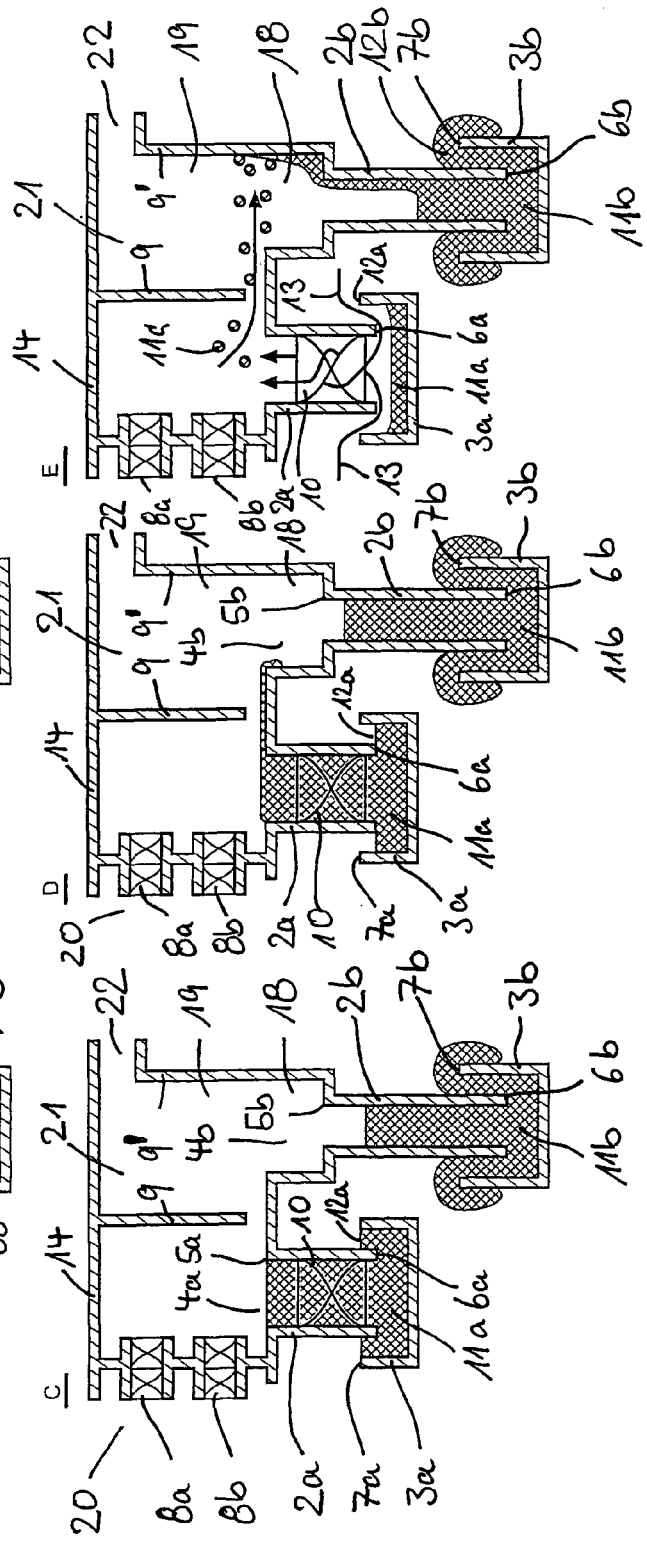

FIG. 2A now shows an oil separator 1 for separating oil or oil mist from blowby gases of an internal combustion engine in normal operation. This separator has a housing 14 through which the blowby gases flow from a pressure side 20 to a suction side 21 (chamber 19) and an outlet 22. This means that the pressure side 20 is connected to the crankcase and the outlet 22 to the inlet manifold of the engine. In this housing, two separation elements 8a and 8b through which the blowby gases flow are disposed between the pressure side 20 and the suction side 21. In the present case, these separation elements 8a and 8b comprise respectively two spiral elements which have helical threads and extend respectively over half a thread height. Separation elements of this type are known from DE 10 2004 011 176 and DE 10 2004 037 157 which are incorporated by reference in their entireties. Respectively two of the spiral elements are disposed one behind the other as separation element 8a or as separation element 8b adjacent thereto. In the housing 14, two siphons are furthermore disposed, the elements of said siphons being provided respectively with the supplement a or b. The first separator has a top pipe 2a which is immersed in an outlet pipe 3a. The top pipe 2a has a lower edge 6a under which the top pipe 2a communicates with the outlet pipe 3a. For its part, the outlet pipe 3a has an outlet 12a with an outlet edge 7a over which the drained oil can overflow into the camshaft housing. The outlet 12a consequently has the same pressure as the pressure side 20, whilst the inlet 4a of the first siphon 2a has the pressure of the suction side 21. The differential pressure which is formed between the inlet 4a and the outlet 12a of the first siphon therefore corresponds to the pressure drop across the separation elements 8a and 8b if further pressure-reducing elements between the crankcase and the inlet manifold are ignored in an idealised representation.

Furthermore, a second siphon is disposed in the housing 14 and likewise has a top pipe 2b and an outlet pipe 3b. The configuration corresponds to that of the first siphon so that the associated elements are not explained further. The crucial difference between the second siphon and the first siphon is that the top pipe 2b has a higher effective barrier height $h_{eff}$ than the top pipe 2a. As a result of the difference in effective barrier height, the barrier pressure of the second siphon is greater than the barrier pressure of the first siphon so that even when the pressure difference between the outlet 12a and the inlet 4a of the first siphon increases so greatly that the latter suctions in gas from the outlet side, the second siphon nevertheless continues to form a barrier. It is of course important also that the volume in the outlet pipe 3b which is produced between the lower edge 6b and the outlet edge 7b is large enough to make sufficient oil available in the case of increases in the pressure difference, said oil being able to be suctioned into the top pipe 2b and hence maintaining the barrier.

Furthermore, a deflection separator 9 is disposed in the suction-side chamber and a wall trap 9' which in addition effects separation of oil from throughflowing gases. In the first siphon, a spiral separation element is disposed in the top pipe 2a, said element being able to be configured comparably to the separation elements 8a and 8b.

The wall trap 9' extends, for its part, into a collection chamber 18 in which the oil separated by the deflection separator 9 and the wall trap 9' can run in order to be collected there and transferred into the second siphon.

FIG. 2A now shows the normal operating state in which the pressure difference between the pressure side 20 and the suction side 21 has its standard value for the normal operating state. The first siphon forms a barrier and at the same time receives oil 11a which is separated by the separation elements 8a and 8b via the inlet 4a for drainage. The second siphon is, in this operating state, without a particular function but it likewise forms a barrier between the pressure side 20 and the suction side 21.

Figure 1A:
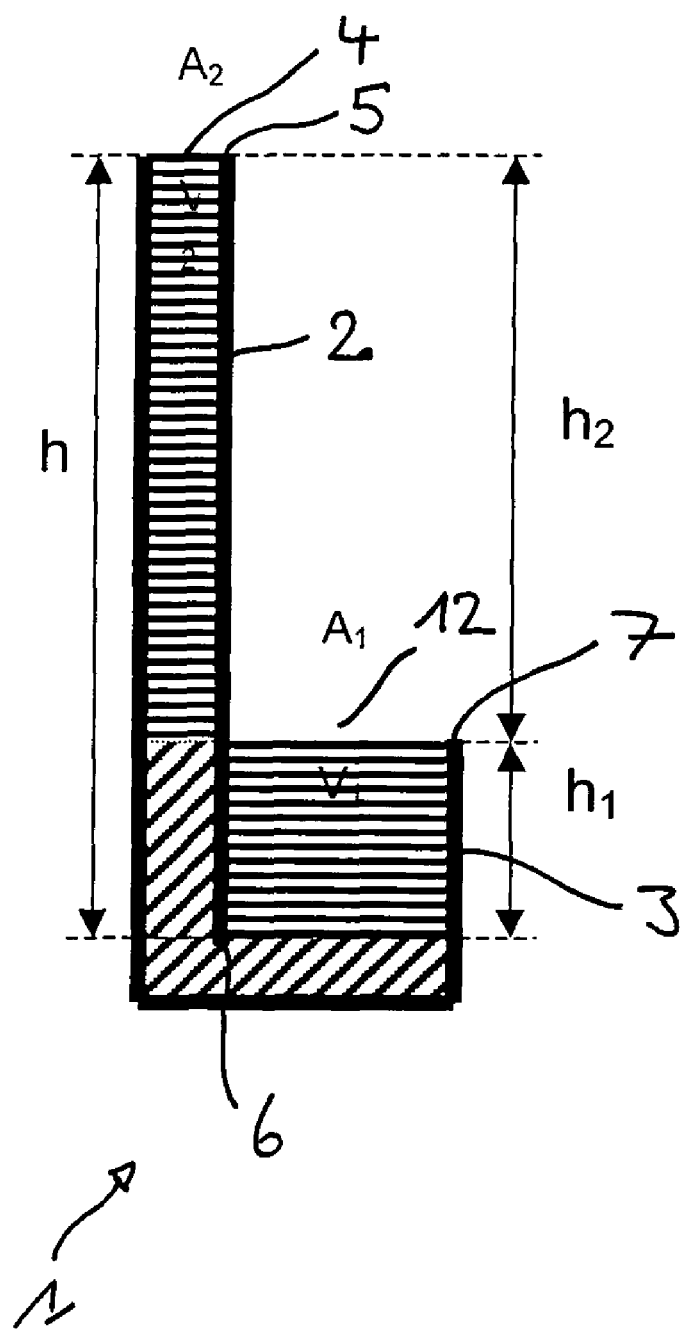
FIG. 1A is a schematic, cut-away side view of one embodiment of a siphon.

In FIG. 2B the limiting case is shown in which the pressure difference between the outlet 12a and the inlet 4a, i.e. between the pressure side 20 and the suction side 21, is precisely so high that the oil level in the top pipe 2a reaches the upper edge 5a of the inlet 4a ($\Delta p = h_2 * \rho$). In this case, drainage is still possible through the first siphon since further separated oil 11a is still able to be drained via the outlet edge 7a. The oil level in the top pipe 2b has likewise increased relative to FIG. 1A.

In FIG. 2C, the state is represented in which the pressure difference is precisely $\Delta p \leq h_2 * \rho$. Oil can no longer be drained here now, however oil can also not be suctioned into the chamber 19. This is the transition state during transition from FIG. 2B to FIG. 2D.

The drainage is represented in FIG. 2D when the pressure difference between the outlet 12a and the inlet 4a has become so great that the liquid level in the outlet pipe 3a already drops without falling below the edge 6a however.

In this case, the oil 11b separated by the separation elements 8a and 8b and also 9 and 9' is discharged via the second siphon.

In FIG. 2E, the extreme case is represented in that for example the separation elements 8a and 8b ice up and thus the flow resistance thereof increases very greatly. In this case, the pressure drop across the separation elements 8a and 8b increases in such a manner that the pressure difference between the pressure side 20 and the suction side 21 exceeds the barrier pressure of the first siphon. The oil 11a situated in the first siphon is then suctioned into the suction chamber 19 so that now a gas path from the pressure side 20 via the outlet 12a of the outlet pipe 3a, the top pipe 2a and the inlet 4a thereof to the suction side 21 is produced. Hence the bypass which is necessary in this case is produced and prevents the pressure difference between the pressure side 20 and the suction side 21 exceeding the permissible amount. The oil 11a which is suctioned in and also the oil or oil mist 11c situated in the gas suctioned through the first siphon are now separated at least roughly via the deflection separator 9 or the wall trap 9' and also by the separation element 10 in the top pipe 2a and subsequently collected in the collection chamber 18. The collection chamber 18, relative to the top pipe 2a situated thereunder, has a larger cross-section. From there, the separated oil 11b runs into the second siphon which continues to form a barrier and now the oil 11b is guided further into the pressure-side region. In this way, at least a rough separation of oil and oil mist 11c from the blowby gases is also possible in emergency operation.

The thus roughly cleaned blowby gas is guided via the outlet 22 to the inlet manifold of the internal combustion engine.

The invention claimed is:

1. A liquid separator for separating liquids from gases, comprising:
a pressure chamber disposed in the gas flow in front of a separation element;
a suction chamber disposed in the gas flow behind said separation element;
a first siphon being disposed in the suction chamber for drainage of separated liquid; and
a second siphon disposed in the suction chamber, a barrier pressure of said second siphon is higher than a barrier pressure of the first siphon.

2. The liquid separator according to claim 1, wherein the effective barrier height of the second siphon is higher than the effective barrier height of the first siphon.

3. The liquid separator according to claim 1, wherein at least for one of the two siphons, the volume of an outlet pipe situated outside a top pipe, measured from a lower edge of the top pipe to an overflow edge of the outlet pipe, corresponds to between 90 and 110%, of the volume of the top pipe, measured from the overflow edge of the outlet pipe to an inlet edge of the top pipe.

4. The liquid separator according to claim 3, wherein at least for one of the two siphons, the volume of the outlet pipe situated outside the top pipe, measured from the lower edge of the top pipe to the overflow edge of the outlet pipe, corresponds to between 95 and 105% of the volume of the top pipe, measured from the overflow edge of the outlet pipe to the inlet edge of the top pipe.

5. The liquid separator according to claim 4, wherein at least for one of the two siphons, the volume of the outlet pipe situated outside the top pipe, measured from the lower edge of the top pipe to the overflow edge of the outlet pipe, corresponds to between 98 and 102% of the volume of the top pipe, measured from the overflow edge of the outlet pipe to the inlet edge of the top pipe.

6. The liquid separator according to claim 3, wherein at least one further liquid separation element is disposed in the top pipe at least of the first siphon.

7. The liquid separator according to claim 1, wherein at least one further liquid separation element is disposed in the suction chamber.

8. The liquid separator according to claim 7, wherein at least one of the liquid separation elements is selected from the group consisting of a cyclone, a spiral element, a deflection separator, and a baffle plate.

9. The liquid separator of claim 1, wherein said liquid separator is an oil separator.

10. The liquid separator of claim 1, wherein said oil separator separates oil from blow-through gases.

11. The liquid separator of claim 1, wherein said liquid separator is a water separator.

12. The liquid separator of claim 1, said second siphon is a barrier to separated liquid from said pressure chamber to said suction chamber.

13. The liquid separator of claim 1, wherein both of said siphons are in communication with said suction chamber and said pressure chamber.

* * * * *

UNITED STATES PATENT AND TRADEMARK OFFICE
CERTIFICATE OF CORRECTION

| | | |
|---|---|---|
| PATENT NO. | : 7,938,870 B2 | Page 1 of 1 |
| APPLICATION NO. | : 11/990551 | |
| DATED | : May 10, 2011 | |
| INVENTOR(S) | : Dieter Grafl and Kai-Uwe Lemke | |

It is certified that error appears in the above-identified patent and that said Letters Patent is hereby corrected as shown below:

ON THE TITLE PAGE:

Item (73) Assignee should read: Dana Automotive Systems Group, LLC, Maumee, OH (US)

Signed and Sealed this
Ninth Day of August, 2011

David J. Kappos
*Director of the United States Patent and Trademark Office*